(12) United States Patent
Harada

(10) Patent No.: US 10,162,368 B2
(45) Date of Patent: Dec. 25, 2018

(54) AUTONOMOUS MOVING MACHINE

(71) Applicant: Panasonic Intellectual Property Corporation of America, Torrance, CA (US)

(72) Inventor: Naoyuki Harada, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 38 days.

(21) Appl. No.: 15/458,928

(22) Filed: Mar. 14, 2017

(65) Prior Publication Data
US 2017/0285661 A1    Oct. 5, 2017

(30) Foreign Application Priority Data

Apr. 1, 2016 (JP) .................. 2016-074524
Nov. 18, 2016 (JP) .................. 2016-225523

(51) Int. Cl.
*G05D 1/00* (2006.01)
*G05D 1/10* (2006.01)
(Continued)

(52) U.S. Cl.
CPC ........... *G05D 1/101* (2013.01); *B64C 39/024* (2013.01); *G01S 19/42* (2013.01); *G05D 1/0088* (2013.01); *B64C 2201/027* (2013.01); *B64C 2201/108* (2013.01); *B64C 2201/141* (2013.01); *G05D 1/00* (2013.01); *G05D 1/10* (2013.01); *H04W 16/18* (2013.01); *H04W 28/02* (2013.01)

(58) Field of Classification Search
CPC .......... G01C 21/00; G01C 21/34; G05D 1/00; G05D 1/10; H04W 16/18; H04W 28/02
USPC ................................................. 701/3, 16, 26
See application file for complete search history.

(56) References Cited

U.S. PATENT DOCUMENTS

2015/0051758 A1* 2/2015 Cho ..................... G05D 1/0676
                                                                701/16
2015/0120126 A1* 4/2015 So ......................... G01C 23/00
                                                                701/26
(Continued)

FOREIGN PATENT DOCUMENTS

JP      2014-149622       8/2014
JP      2016-173709 A     9/2016

OTHER PUBLICATIONS

The Extended European Search Report dated Sep. 12, 2017 for the related European Patent Application No. 17162043.8.
(Continued)

Primary Examiner — Thomas G Black
Assistant Examiner — Wae L Louie
(74) Attorney, Agent, or Firm — Greenblum & Bernstein, P.L.C.

(57) ABSTRACT

An aspect of the present disclosure relates to an autonomous moving machine which may maintain the self-location with high reliability. Operations of the moving machine include acquiring sensor information about the self-location, estimating the self-location based on the sensor information, calculating the reliability of the estimated self-location, recording the reliability in association with the estimated self-location. When the reliability satisfies a given condition, the operations include moving the moving machine to a position at which the reliability is high, based on the reliability.

12 Claims, 8 Drawing Sheets

(51) Int. Cl.
*B64C 39/02* (2006.01)
*G01S 19/42* (2010.01)
*H04W 28/02* (2009.01)
*H04W 16/18* (2009.01)

(56) References Cited

U.S. PATENT DOCUMENTS

| | | | | |
|---|---|---|---|---|
| 2016/0117932 | A1* | 4/2016 | Park | G01S 19/39 |
| | | | | 701/3 |
| 2017/0069214 | A1* | 3/2017 | Dupray | G08G 5/0021 |
| 2017/0094530 | A1* | 3/2017 | Ross | B64C 39/024 |
| 2017/0285640 | A1* | 10/2017 | Harada | G05B 19/048 |
| 2017/0285661 | A1* | 10/2017 | Harada | B64C 39/024 |
| 2017/0344939 | A1* | 11/2017 | Linton | G01S 5/0294 |
| 2018/0074520 | A1* | 3/2018 | Liu | G05D 1/104 |
| 2018/0091939 | A1* | 3/2018 | Venkatraman | H04W 4/021 |
| 2018/0112983 | A1* | 4/2018 | Ahmed | G01C 21/005 |
| 2018/0124631 | A1* | 5/2018 | Ramos de Azevedo | |
| | | | | H04W 28/0226 |
| 2018/0143313 | A1* | 5/2018 | Wetzler | G01S 5/163 |
| 2018/0157255 | A1* | 6/2018 | Halverson | B64C 39/024 |

OTHER PUBLICATIONS

Zhang Qiwen et al: "Ear-based exploration on hybrid metric/topological maps", 2014 IEEE/RSJ International Conference on Intelligent Robots and Systems, IEEE, Sep. 14, 2014, pp. 3081-3088, XP032676577.

* cited by examiner

FIG. 3

| TIME | COORDINATE POSITION | RELIABILITY |
|---|---|---|
| 0 | A | 0.9 |
| 1 | B | 0.7 |
| 2 | C | 1.0 |
| 3 | D | 0.8 |
| 4 | E | 0.6 |
| 5 | F | 0.5 |
| 6 | G | 0.3 |

AUTONOMOUS MOVING MACHINE

BACKGROUND

1. Technical Field

This present disclosure relates to an autonomous moving machine that measures its own location (self-location) by using sensors and that controls a moving unit so as to autonomously move to a destination.

2. Description of the Related Art

In the related art, an autonomous moving machine that is capable of autonomously moving to a destination while grasping the self-location by using various sensors has been proposed. When such an autonomous moving machine fails to obtain the self-location, the autonomous moving machine fails to arrive at a predetermined place and perform target operations.

For example, Japanese Unexamined Patent Application Publication No. 2014-149622 discloses an autonomous flying robot which uses map information that includes information about obstacles such as a building and that is stored in advance and a measurement result from a sensor so as to autonomously move while obtaining the self-location. When a significant change in the surrounding environment which is caused by an occurrence of a rather large obstacle such as a truck results in failure to obtain the self-location, the autonomous flying robot obtains the self-location again after raising the flight altitude, so as to perform target operations.

However, it is not possible to apply the technique of obtaining the self-location again, to an autonomous moving machine that runs on the ground. In addition, when a bridge or an electric wire is present in the air, it may be difficult to raise the altitude.

Further, when the map information does not match the information from the sensor, the self-location is obtained again. Therefore, it is not possible to address a case in which the self-location may not be obtained due to another cause.

SUMMARY

One non-limiting and exemplary embodiment provides an autonomous moving machine that is capable of continuously obtaining the self-location with high reliability regardless of a method for obtaining the self-location or a cause of failure to obtain the self-location.

In one general aspect, the techniques disclosed here feature a moving machine moving to a destination through autonomous control. The moving machine includes a sensor that obtains a self-location, a processor; and a memory storing thereon a computer program. When executed by the processor, the computer program causes the processor to perform operations including obtaining pieces of sensor information about the self-location from the sensor successively, for each of the obtained pieces of sensor information, estimating the self-location on the basis of the piece of sensor information, calculating a reliability of the estimated self-location, recording the calculated reliability in association with the estimated self-location, and moving the moving machine to a position on the basis of the recorded information in the case where the calculated reliability satisfies a given condition. The position is a position at which the reliability is high.

According to the present disclosure, when the reliability of the self-location which has been grasped is below a given criterion, the moving machine moves to a position at which the self-location may be obtained with high reliability, on the basis of the track records. Therefore, the moving machine may autonomously move while stably grasping the self-location with high reliability.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a diagram visually illustrating exemplary data stored in a storage unit;

DETAILED DESCRIPTION

Figure 1:
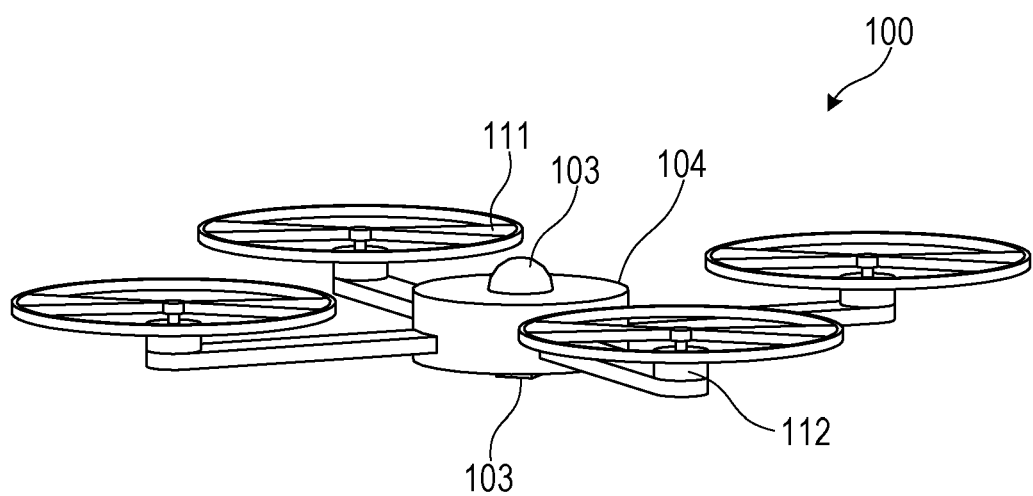
FIG. 1 is a perspective view of the appearance of an autonomous moving machine according to a first embodiment.

Embodiments for an autonomous moving machine according to the present disclosure will be described by referring to the drawings. The embodiments described below merely describe exemplary autonomous mobile bodies according to the present disclosure. Therefore, the scope of the present disclosure is defined by the claim wording by using the following embodiments as a reference, and the present disclosure is not limited only to the following embodiments. Accordingly, among the components in the following embodiments, components not recited in the independent claim describing the uppermost concept are not necessary to achieve the challenge of the present disclosure, and are described as components included in a more preferable embodiment.

The drawings show schematic views obtained by appropriately making emphasis, omission, and adjustment of a ratio in order to illustrate the present disclosure. Shapes, positional relationships, and ratios in the drawings may be different from the actual ones.

First Embodiment

A first embodiment in the present disclosure will be described by using an autonomous flying vehicle, that is, a so-called drone, as an exemplary autonomous moving machine 100.

FIG. 1 is a perspective view of the appearance of the autonomous moving machine according to the first embodiment.

Figure 2:
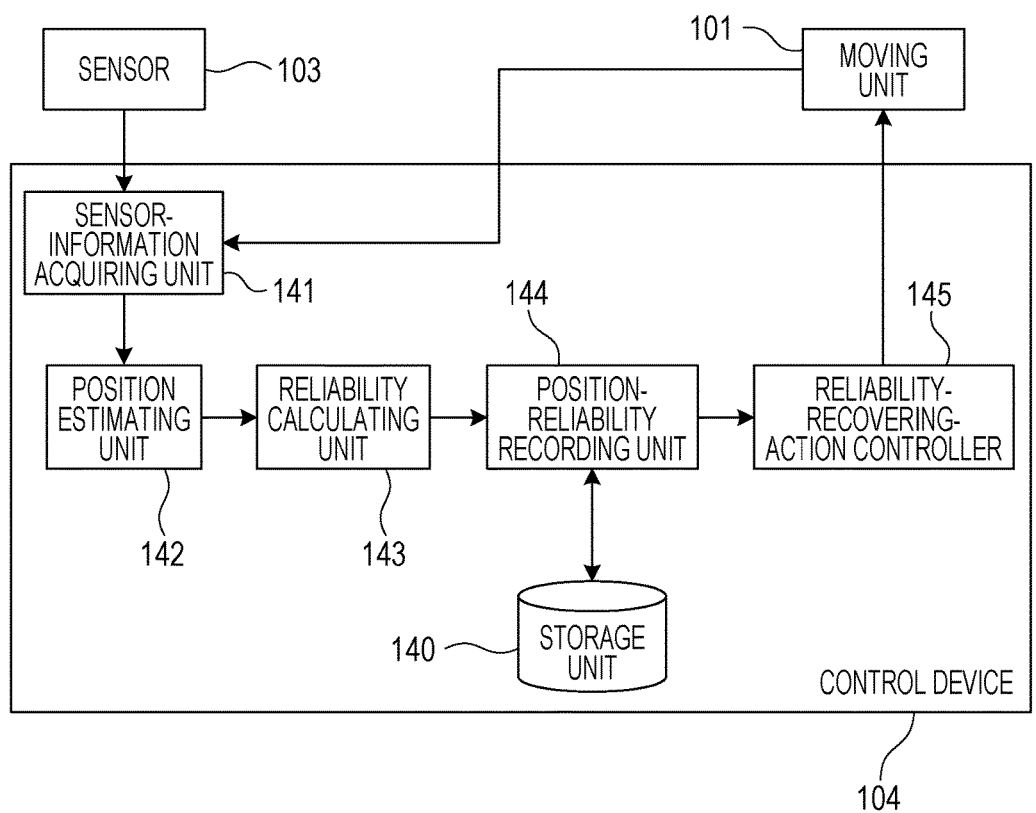
FIG. 2 is a block diagram illustrating some functional units included in a controller, as well as some mechanical units.

FIG. 2 is a block diagram illustrating some functional units included in a controller, as well as some mechanical units.

As illustrated in FIGS. 1 and 2, the autonomous moving machine 100 used in the first embodiment includes multiple rotors 111 (propellers) serving as a moving unit 101, multiple motors 112 which individually drive the respective rotors 111, sensors 103 for obtaining its own location (self-location), and a control device 104 which obtains signals from the sensors 103 and which controls the motors 112 to regulate autonomous locomotion.

The drone-type autonomous moving machine 100 including multiple rotors 111 may individually control the rotational speeds of the rotors 111 so that the autonomous moving machine 100 may move in various directions (for example, forward, backward, leftward, rightward, upward, and downward) and the attitude of the autonomous moving machine 100 may be adjusted. In the first embodiment, the control device 104 also obtains information based on the control state of the rotational speeds of the rotors 111, as sensor information from the moving unit 101, and uses it as a piece of information for estimating the self-location.

The sensors 103 are not particularly limited as long as they may obtain information for estimating the self-location through measurement. Specifically, examples of the sensor 103 include an inertial measurement unit (IMU) which detects angles and speeds in the three axis directions and accelerations in the three axis directions, a pressure gauge (altimeter), a flowmeter (anemometer), a global positioning system (GPS) tuner, a laser range finder (LRF), and a depth camera. In addition, the autonomous moving machine 100 includes the sensors 103 of one type among the multiple types or the sensors 103 of multiple types. The sensors 103 included in the autonomous moving machine 100 are appropriately selected in accordance with the type and the flight purpose of the autonomous moving machine 100 and a place in which the autonomous moving machine 100 moves.

As illustrated in FIG. 2, the control device 104 controls the moving unit 101 on the basis of information obtained from the sensors 103 and the like so that the autonomous moving machine 100 moves. The control device 104 is a computer including a so-called central processing unit (CPU) or the like which executes programs stored in a storage unit 140 or the like so as to perform various types of processing. The control device 104 includes a sensor-information acquiring unit 141, a position estimating unit 142, a reliability calculating unit 143, a position-reliability recording unit 144, and a reliability-recovering-action controller 145 which serve as processors performing operations by using the programs.

The storage unit 140 which includes information storage devices, such as a read only memory (ROM) and a hard disk drive (HDD), stores the programs used for the processors, self-location information, and the like. The storage unit 140 also stores information about the position of the destination, map information indicating, for example, a route and obstacles, and the like.

The sensor-information acquiring unit 141 is a processor that acquires signals obtained through measurement using the sensors 103, as sensor information used in estimation of the self-location. The sensor-information acquiring unit 141 also acquires information obtained from the moving unit 101, for example, control information such as the rotational speeds of the rotors 111, as sensor information.

The position estimating unit 142 is a processor that estimates the self-location which describes the current position of the autonomous moving machine 100, on the basis of the sensor information. In the first embodiment, the position estimating unit 142 calculates measurement positions which are results of actual measurement using the sensors 103, on the basis of the multiple pieces of sensor information. Then, the position estimating unit 142 synthesizes the measurement positions, and estimates the self-location. A method for estimating the self-location is not particularly limited. For example, the self-location may be estimated through a Kalman filter by using a measurement position calculated on the basis of a signal received from a GPS satellite, a measurement position calculated on the basis of sensor information from the inertial measurement unit, and the like. Instead, the self-location may be estimated through simultaneous localization and mapping (SLAM) by using a measurement position calculated by checking sensor information from the depth camera against the map information stored in the storage unit 140, a measurement position calculated on the basis of the sensor information from the inertial measurement unit, and the like.

When a Kalman filter is employed as the position estimating unit 142, the self-location is expressed as a normal distribution. The variance of the normal distribution increases in accordance with an elapsed time or the amount of movement after the latest measurement of an absolute position, and measurement of another absolute position decreases the variance. That is, the reliability decreases in accordance with an elapsed time or the amount of movement after the latest measurement of an absolute position, and measurement of another absolute position increases (recovers) the reliability. Measurement of an absolute position is performed through positioning using the GPS or observation of a landmark whose position is known.

The reliability calculating unit 143 is a processor that calculates the reliability of the self-location, for example, on the basis of the reliabilities of the sensors 103 themselves used in measurement, decrease in the reliability over time, and an error in the sensor information used in estimation of the self-location. For example, the reliability calculating unit 143 calculates the reciprocal of the variance as a reliability by using a distribution (for example, a normal distribution) used when the position estimating unit 142 estimates the self-location.

The position-reliability recording unit 144 is a processor that records the self-location estimated by the position estimating unit 142 in association with the reliability calculated by the reliability calculating unit 143 in the storage unit 140. In the first embodiment, as illustrated in FIG. 3, the position-reliability recording unit 144 further records time information in association with the self-location and the reliability which are associated with each other, in the storage unit 140. The time information is, for example, information indicating the time at which the position estimating unit 142 estimates the self-location. In FIG. 3, identification symbols for distinguishing one from another are illustrated for the information about the time and the coordinates, not the reliability. The identification symbols do not have specific meaning.

The reliability-recovering-action controller 145 is a processor that, when the reliability calculated by the reliability calculating unit 143 satisfies a given condition, controls the moving unit 101 so that the autonomous moving machine 100 moves to a position at which a higher reliability has been obtained, on the basis of the information recorded by the position-reliability recording unit 144.

Figure 4:
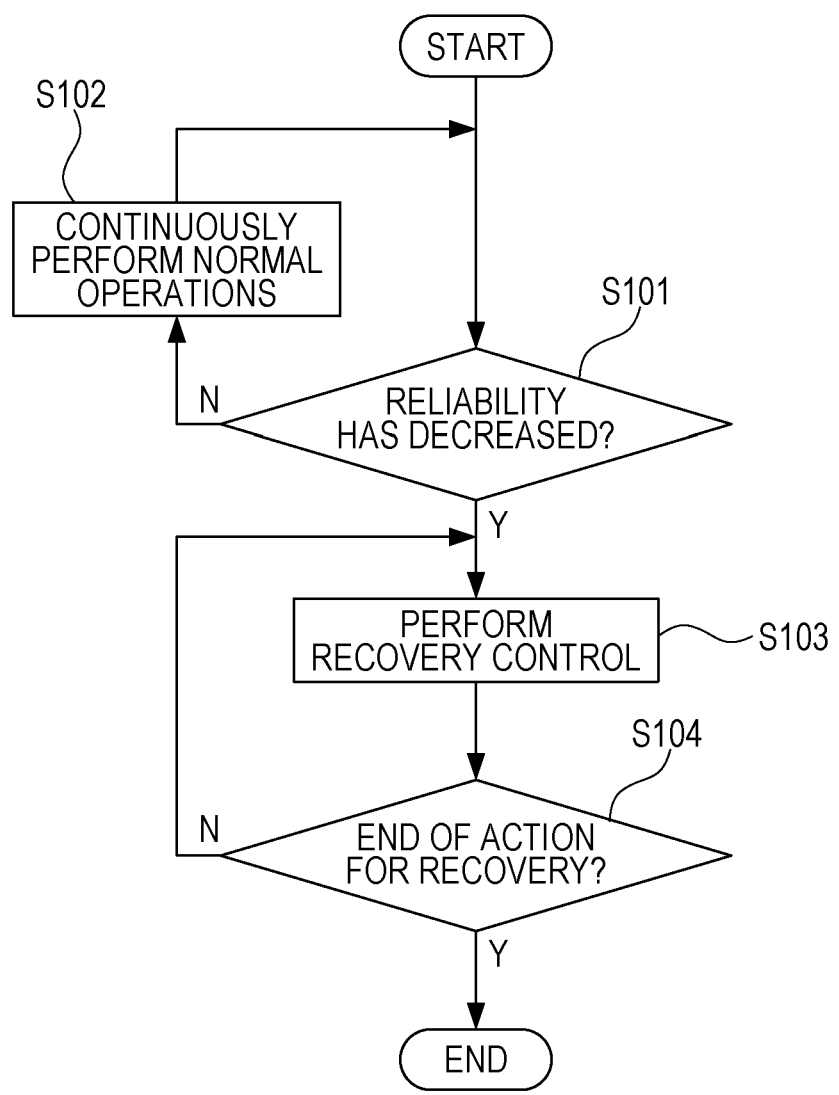
FIG. 4 is a flowchart illustrating the flow of a process performed by a reliability-recovering-action controller according to the first embodiment.

FIG. 4 is a flowchart illustrating the flow of a process performed by the reliability-recovering-action controller 145.

As illustrated in FIG. 4, the reliability-recovering-action controller 145 determines whether or not the reliability satisfies a given condition (S101). If the reliability does not satisfy the given condition (S101:N), normal operations are continuously performed. The normal operations are operations, such as an operation in which the autonomous moving machine 100 moves to a target position and an inspection operation performed at the target position.

Examples (patterns) of a specific determination method used when the reliability satisfies the given condition are listed below.

1-1. The reliability-recovering-action controller 145 successively obtains a reliability calculated by the reliability calculating unit 143. When the obtained reliability is less than a predetermined second threshold, the reliability-recovering-action controller 145 determines that the reliability has decreased, and performs recovery control (S103).

1-2. The reliability-recovering-action controller 145 performs statistical processing on reliabilities obtained during a given period starting from the current time, among the reliabilities stored in the storage unit 140, and successively calculates a statistical reliability. Then, the reliability-recovering-action controller 145 calculates the difference between a reliability successively obtained by the reliability calculating unit 143 and the statistical reliability. When the difference is equal to or more than a third threshold, the reliability-recovering-action controller 145 determines that the reliability has rapidly decreased, and performs recovery control (S103).

1-3. The reliability-recovering-action controller 145 checks the reliabilities stored in the storage unit 140 starting from the current one in reverse chronological order. When a period in which the reliability continues to decrease is longer than a predetermined fourth threshold, the reliability-recovering-action controller 145 determines that the reliability has decreased, and performs recovery control (S103).

Examples (patterns) of a specific recovery control method are listed below.

2-1. The reliability-recovering-action controller 145 controls the moving unit 101 on the basis of the reliabilities stored in the storage unit 140 so that the autonomous moving machine 100 moves to the self-locations stored in the storage unit 140, sequentially in reverse chronological order until the reliability becomes equal to or larger than a first threshold.

Specific description will be made on the basis of the data illustrated in FIG. 3. As a precondition, the current time is 6, and the first threshold is 0.8. The reliability-recovering-action controller 145 controls the moving unit 101 so that the autonomous moving machine 100 moves to the following coordinate positions in this sequence: the current position (reliability 0.3), F (reliability 0.5), E (reliability 0.6), and D (reliability 0.8). That is, the reliability-recovering-action controller 145 causes the autonomous moving machine 100 to go back along the route along which the autonomous moving machine 100 has moved, to the coordinates at which the reliability is equal to or larger than the first threshold.

As described above, the self-location is estimated again at a coordinate position at which a high reliability has been obtained, and an action for performing the normal operations is started.

Such a recovery action is effective, for example, when the autonomous moving machine 100 is moving in a space at the first time or when the reliability rapidly decreases, for example, due to wind blowing gustily.

2-2. The reliability-recovering-action controller 145 controls the moving unit 101 so that the autonomous moving machine 100 moves to a position for which the reliability stored in the storage unit 140 is equal to or larger than the first threshold and which is closest to the current self-location.

Figure 5:
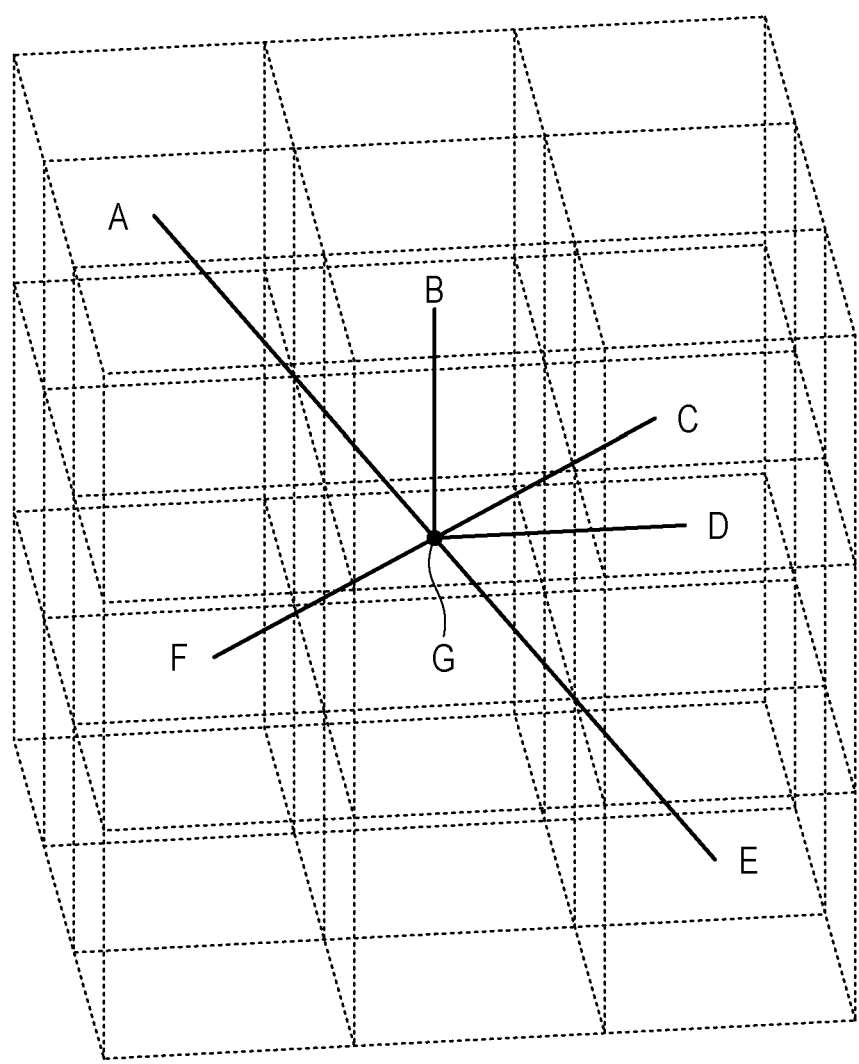
FIG. 5 is a perspective view three-dimensionally illustrating a positional distribution of reliability with the autonomous moving machine being positioned at the center.

Specifically, as illustrated in FIG. 5, coordinate positions (A, C, and D), each of which is present in a space (upward, downward, frontward, backward, leftward, and rightward) surrounding the center that is at the self-location of the autonomous moving machine 100 obtained when the reliability satisfies the given condition (at the current time 6), and at each of which the reliability is equal to or larger than the first threshold (0.8), are extracted from the storage unit 140. Further, a Euclidean distance between each coordinate position and the current self-location is calculated. The moving unit 101 is controlled so that the autonomous moving machine 100 moves directly to the coordinate position (D) for which the Euclidean distance is the smallest.

As described above, the autonomous moving machine 100 may arrive at a coordinate position at which a high reliability has been obtained, in a short time. The autonomous moving machine 100 may estimate the self-location again at the coordinate position, and may start an action for performing the normal operations in a shorter time.

Such a recovery action is effective, for example, when the autonomous moving machine 100 performs inspection operations in a small space.

2-3. The reliability-recovering-action controller 145 controls the moving unit 101 so that the autonomous moving machine 100 moves to a position at which the reliability is equal to or larger than the first threshold and which is associated with time information indicating a time nearest to the current time.

Specific description will be described on the basis of the data illustrated in FIG. 3. As a precondition, the current time is 6, and the first threshold is 0.8. The reliability-recovering-action controller 145 checks the reliabilities at time 5 (reliability 0.5), time 4 (reliability 0.6), and time 3 (reliability 0.8) in this sequence in reverse chronological order, and controls the moving unit 101 so that the autonomous moving machine 100 directly moves to the coordinates at which the reliability is equal to or larger than the first threshold, that is, the coordinate position D.

As described above, the autonomous moving machine 100 may arrive at a coordinate position at which a high reliability has been obtained, in a shorter time. The autonomous moving machine 100 may estimate the self-location again at the coordinate position, and may start an action for performing the normal operations, in a shorter time.

Such a recovery action is effective, for example, when the autonomous moving machine 100 is moving in a large space in which a small quantity of obstacles are present.

Second Embodiment

Subsequently, another embodiment for the autonomous moving machine 100 will be described. Components (parts) having operations, functions, shapes, mechanisms, and structures similar to those of the first embodiment are designated with identical reference numerals, and, in some cases, are not described. In the description below, differences from the first embodiment will be mainly described, and repeated description may be avoided.

Figure 6:
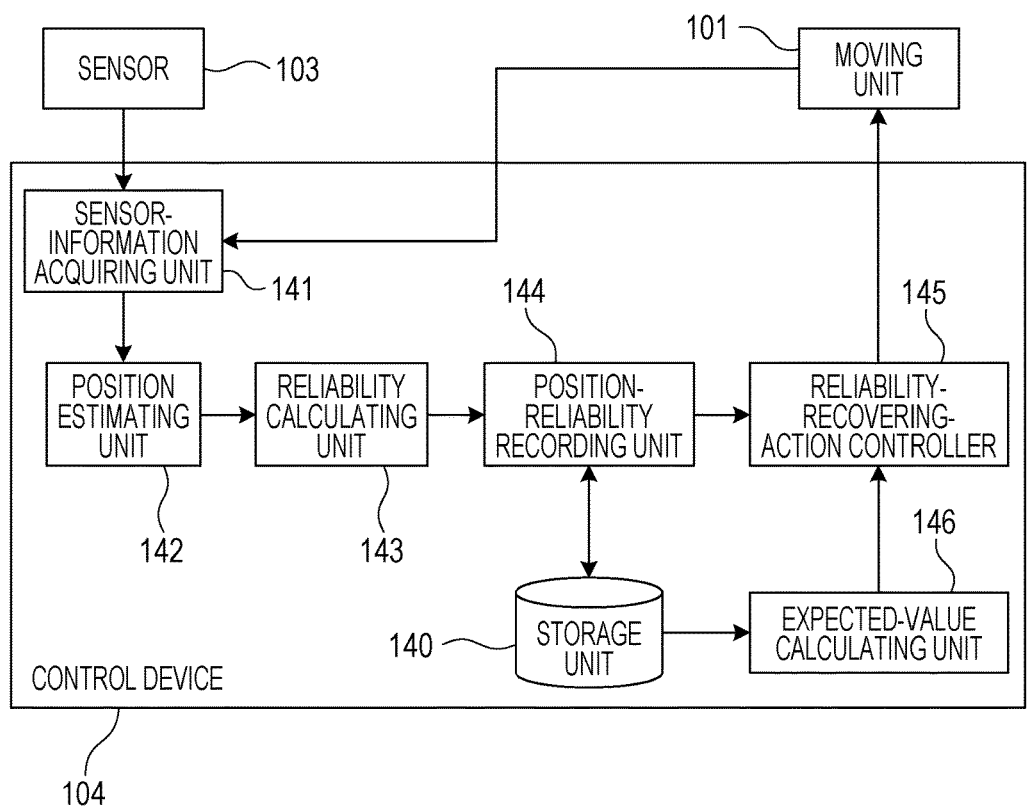
FIG. 6 is a block diagram illustrating some functional units included in a controller according to a second embodiment, as well as some mechanical units.

FIG. 6 is a block diagram illustrating some functional units included in a controller according to the second embodiment, as well as some mechanical units.

The control device 104 according to the second embodiment is similar to that in the first embodiment other than addition of an expected-value calculating unit 146.

The expected-value calculating unit 146 is a processor that divides a space whose center is at the self-location of the autonomous moving machine 100, and that calculates an expected value for each divided space on the basis of the reliabilities which are included in the divided space and which are stored in the storage unit 140.

Figure 7:
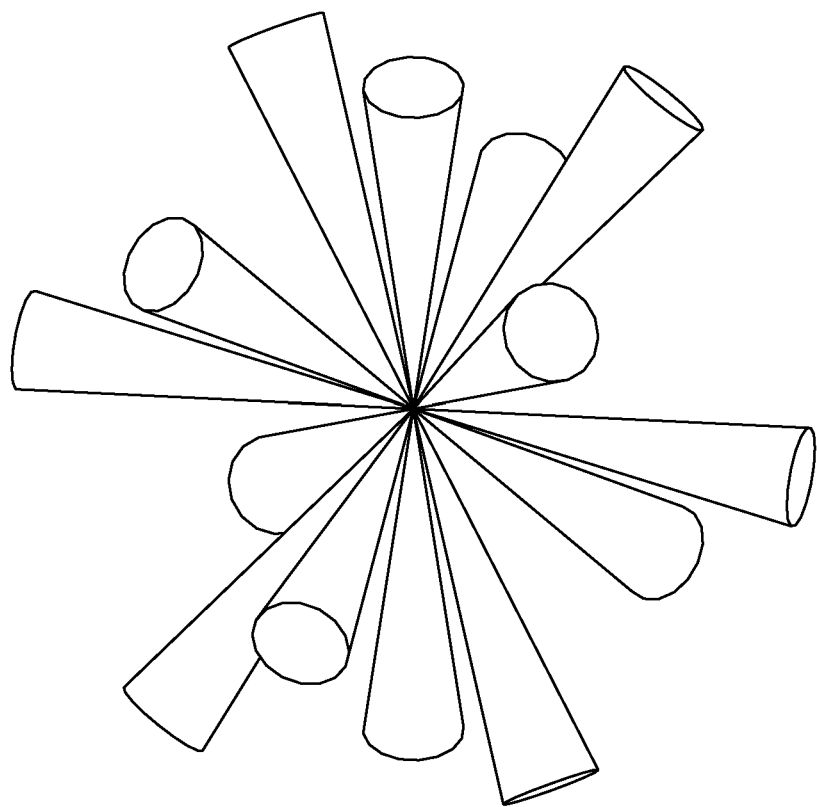
FIG. 7 is a perspective view of an image of spaces formed when an expected-value calculating unit is to calculate expected values.

Specifically, as illustrated in the image in FIG. 7, the expected-value calculating unit 146 radially divides a space whose center is at the self-location of the autonomous moving machine 100 which is obtained when the reliability satisfies the given condition, and extracts the reliabilities contained in each divided space from the storage unit 140. Then, the expected-value calculating unit 146 performs statistical processing on the reliabilities contained in the divided space, and calculates an expected value for the divided space. In the second embodiment, the time does not necessarily need to be associated with the self-location and the reliability which are associated with each other.

Specific determination methods performed by the reliability-recovering-action controller in the second embodiment 145 are listed below.

2-4. When the reliability satisfies the given condition, the reliability-recovering-action controller 145 obtains an expected value for each divided space from the expected-value calculating unit 146. Further, the reliability-recovering-action controller 145 compares an expected value from another, and controls the moving unit 101 so that the autonomous moving machine 100 directly moves in the direction to the divided space for which the largest expected value has been obtained, for example, to the coordinate position D. In addition, the reliability-recovering-action controller 145 causes the autonomous moving machine 100 to move until the autonomous moving machine 100 is closest to coordinates at which the reliability is equal to or larger than the first threshold.

As described above, the autonomous moving machine 100 may arrive at a coordinate position at which a high reliability has been obtained, with a high probability. The autonomous moving machine 100 may estimate the self-location again at the coordinate position, and may start an action for performing the normal operations, with more certainty.

Such a recovery action is effective, for example, when the autonomous moving machine 100 moves over a large area or when the autonomous moving machine 100 performs operations many times in the same area for the long term.

EXAMPLE

An example for the autonomous moving machine 100 will be described.

Figure 8:
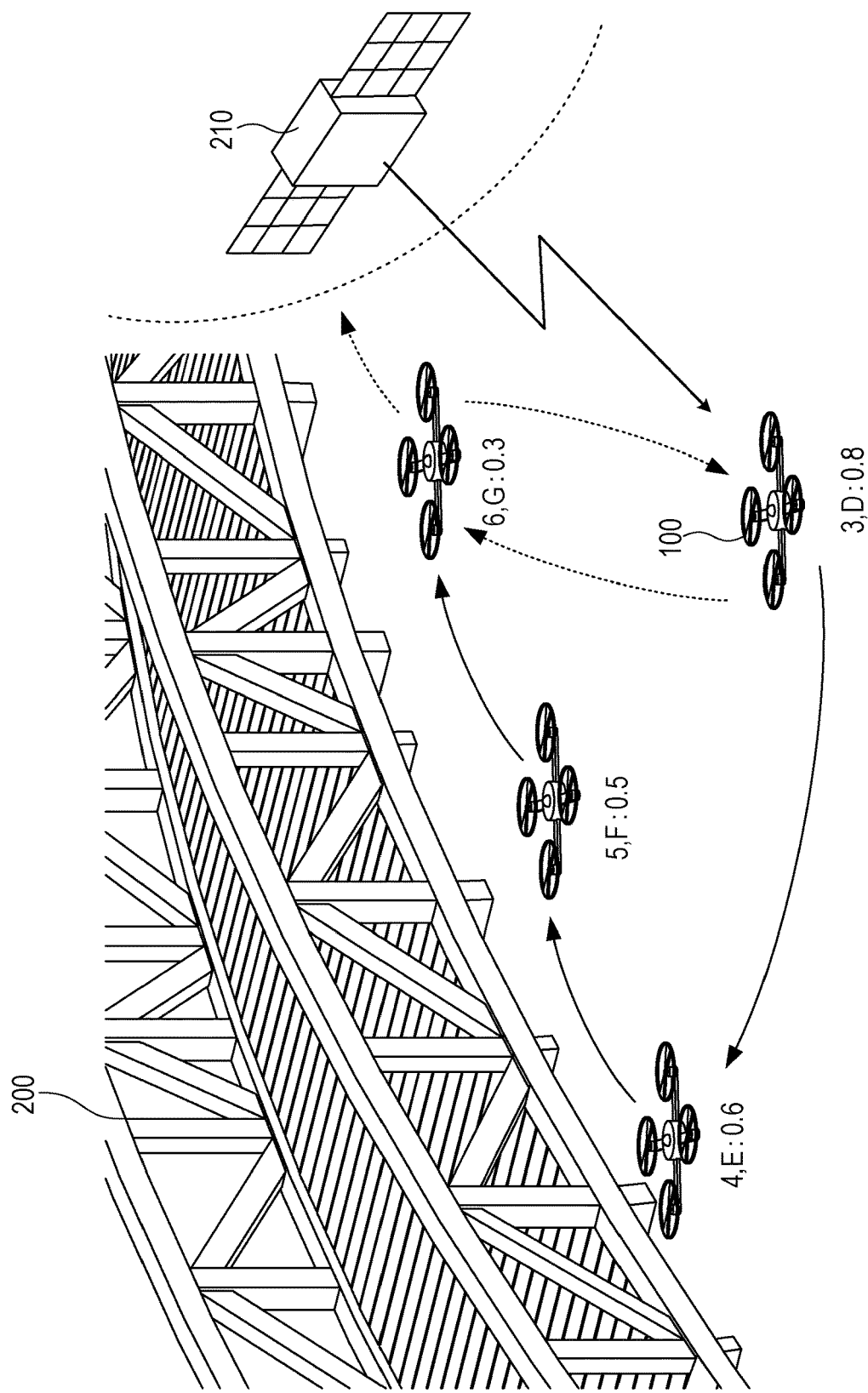
FIG. 8 is a perspective view of an autonomous moving machine performing a bridge inspection operation.

FIG. 8 is a perspective view of an autonomous moving machine performing a bridge inspection operation.

As illustrated in FIG. 8, in this example, the autonomous moving machine 100 is a drone. The autonomous moving machine 100 inspects the undersurface of a bridge 200, and a camera for inspection which is installed on the top of the autonomous moving machine 100 is used to capture images of the undersurface of the bridge 200 in a large area. For example, cracks of structural members are detected on the basis of a video captured by the autonomous moving machine 100 and the position at which the video is captured.

In such an operation, the autonomous moving machine 100 flies from a given position A and arrives at a position D via which the autonomous moving machine 100 flies to a destination, at time 3. The position D is a position at which a signal may be received from a GPS satellite 210 with high sensitivity, and the reliability at the position D is 0.8.

Then, on the basis of sensor information from the sensors 103, such as an IMU and a GPS, the autonomous moving machine 100 arrives at a position E below the bridge 200 at time 4, while estimating the self-location by using a Kalman filter, and starts capturing of images of the bridge 200. It is difficult to receive a signal from the GPS satellite 210 below the bridge 200. However, the self-location is estimated on the basis of the sensor information from the sensors 103 such as an IMU, and the reliability is 0.6.

The autonomous moving machine 100 captures images of the bridge 200 while moving below the bridge 200, and goes from the position E via a position F to a position G. In the course of going from the position E via the position F to the position G, the autonomous moving machine 100 fails to obtain a signal from the GPS satellite 210. Therefore, the reliability for the self-location decreases over time.

At the stage in which the autonomous moving machine 100 arrives at the position G, the reliability is equal to or less than the predetermined second threshold (0.3). Therefore, the reliability-recovering-action controller 145 controls the moving unit 101 so that the autonomous moving machine 100 moves to the position D for which the reliability stored in the storage unit 140 is equal to or larger than the first threshold (0.7) and which is closest to the current self-location G.

Through control of the moving unit 101, since the reliability of the self-location is recovered, the autonomous moving machine 100 which has directly moved to the position D directly goes back to the position G which is the first position at which the recovery action is taken, and captures images of the bridge 200 again.

As described above, the autonomous moving machine 100 is moved. This enables the autonomous moving machine 100 to effectively perform operations while keeping the reliability of the self-location high.

The present disclosure is not limited to the above-described embodiments. For example, another embodiment in which components herein described are combined with one another in any manner or in which some components are excluded may be used as an embodiment of the present disclosure. Modified embodiments obtained by making, on the above-described embodiments, various modifications conceived by a person skilled in the art without departing from the gist of the present disclosure, that is, without departing from the meaning indicated by the claim wording are also included in the present disclosure.

For example, in the above-described embodiments, an autonomous flight vehicle that is capable of moving freely in the three-dimensional directions, that is, a so-called drone that is capable of flying in a space is illustrated by example as the autonomous moving machine 100. The autonomous moving machine 100 is not limited to this. Examples of the autonomous moving machine 100 include an autonomous moving vehicle that moves on the ground, and an autonomous ship that moves over a water surface.

The sensors 103 are not particularly limited to those that are capable of performing measurement to obtain information for estimation of the self-location, and encompasses any type of sensors other than those listed above.

All of the processors are implemented by using the single control device 104. Each process may be performed by using multiple controllers, and information may be received/transmitted through communication with each other.

The expected-value calculating unit 146 calculates expected values for radial spaces. This is not limiting. A space may be divided in any manner, such as block-shaped spaces as illustrated in FIG. 5 for which expected values are calculated.

As the condition for ending the recovery action, the following condition may be employed: the self-location and the reliability are successively calculated even in the recovery action, and, when the obtained reliability is larger than a given value, the recovery action is ended. In addition, when the destination matches the self-location, the recovery action may be ended.

After the reliability is recovered, the autonomous moving machine 100 may go back to a position at which the recovery action has started, or may directly go to the destination from the position at which the reliability is recovered.

The present disclosure may be used for a vehicle, a train, a ship, an aircraft, a cleaner, and the like which move autonomously.

What is claimed is:

1. A moving machine configured to move to a target location through autonomous control, the moving machine comprising:
    a sensor that obtains a self-location of the moving machine,
    a processor; and
    a memory storing a computer program, the computer program, when executed by the processor, causing the processor to perform operations including:
        obtaining sensor information related to the self-location of the moving machine from the sensor,
        estimating the self-location of the moving machine based on the sensor information,
        calculating a reliability of the self-location of the moving machine,
        recording the reliability and the self-location as history information, the reliability being associated with the self-location, and
        moving the moving machine to a position at which the reliability of the self-location of the moving machine is high based on the history information when the reliability satisfies a predetermined condition.

2. The moving machine according to claim 1,
wherein the reliability decreases in accordance with an elapsed time or a travel amount of the moving machine, the elapsed time and the travel amount being measured after the sensor measures an absolute position of the moving machine, and the reliability increases in response to the sensor measuring an absolute position of the moving machine, and
wherein the absolute position is measured by using a GPS or a land mark at a known position.

3. The moving machine according to claim 2,
wherein the moving machine moves to past self-locations of the moving machine sequentially in a reverse chronological order based on the history information until the reliability becomes equal to or larger than a first threshold.

4. The moving machine according to claim 2,
wherein the moving machine moves to a position at which the reliability is equal to or larger than a first threshold and which is closest to a current self-location of the moving machine.

5. The moving machine according to claim 2,
wherein the recording includes recording time information associated with the self-location and the reliability as the history information, the time information corresponding to a time at which the calculation of the reliability is performed, and
wherein the moving machine moves to a position at which the reliability is equal to or larger than a first threshold and which is associated with the time information indicating a time closest to a current time.

6. The moving machine according to claim 2, the operations further including
dividing a space whose center is at a current self-location of the moving machine, and calculating an expected value for each divided space based on reliabilities of self-locations of the moving machine contained in the divided space,
wherein the moving machine moves in a direction in which a divided space for which a highest expected value is obtained is present.

7. The moving machine according to claim 2,
wherein the reliability satisfies the predetermined condition when the reliability is less than a second threshold.

8. The moving machine according to claim 2,
wherein the reliability satisfies the predetermined condition when the reliability decreases rapidly.

9. The moving machine according to claim 2,
wherein the moving machine is a drone.

10. The moving machine according to claim 9,
wherein the sensor information is a number of rotation of a rotor of the drone.

11. The moving machine according to claim 1,
wherein the reliability satisfies the predetermined condition when the reliability continuously decreases over a predetermined time.

12. The moving machine according to claim 1,
wherein the self-location is estimated by using a normal distribution, and
wherein the reliability of the self-location is calculated by calculating a reciprocal of a variance of the normal distribution.

* * * * *